Nov. 20, 1951  E. A. BETHIG  2,575,483
GAS MASK CANISTER

Filed Feb. 16, 1950  3 Sheets-Sheet 1

INVENTOR

ERIC A. BETHIG

BY  *Donald M. Stewart*

ATTORNEY

Nov. 20, 1951  E. A. BETHIG  2,575,483
GAS MASK CANISTER
Filed Feb. 16, 1950  3 Sheets-Sheet 2
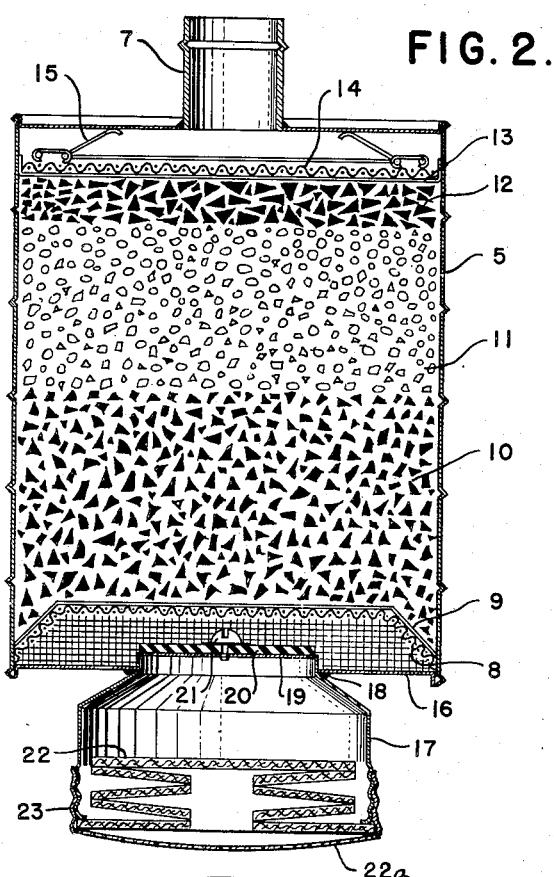
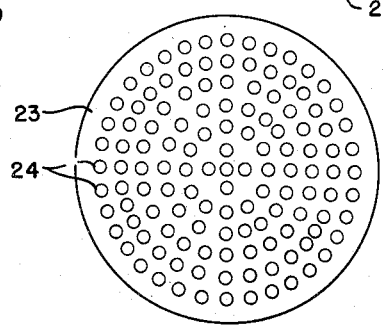
INVENTOR
ERIC A. BETHIG
BY Donald M. Stewart
ATTORNEY

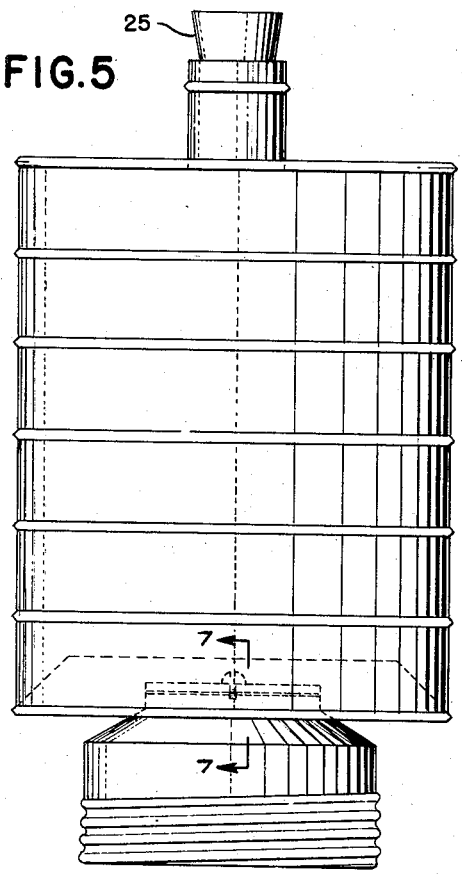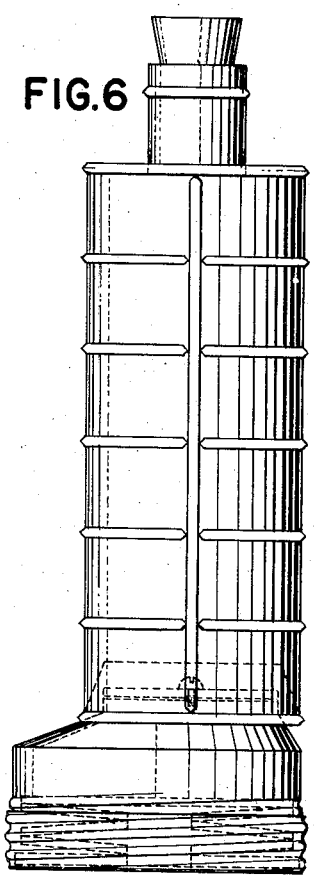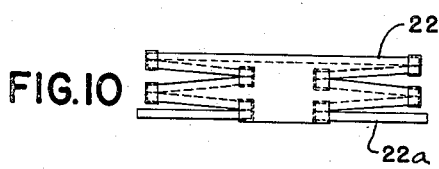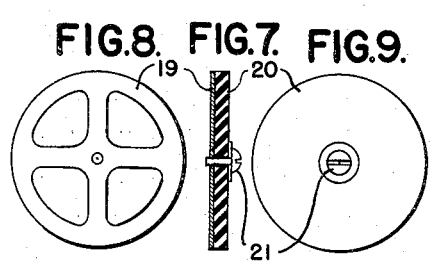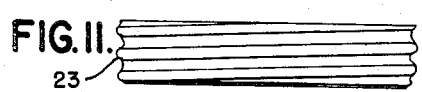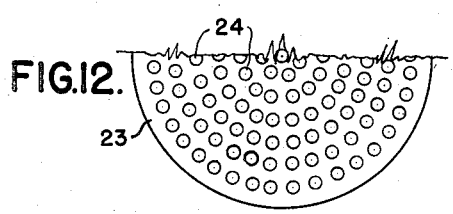
INVENTOR
ERIC A. BETHIG
BY Donald M. Stewart
ATTORNEY Patented Nov. 20, 1951

2,575,483

UNITED STATES PATENT OFFICE 2,575,483

GAS MASK CANISTER

Eric A. Bethig, Reading, Pa., assignor to Willson Products, Inc., Reading, Pa., a corporation of Pennsylvania Application February 16, 1950, Serial No. 144,465

2 Claims. (Cl. 183—39)

1

This invention relates generally to a filtering device, and more particularly to a gas mask canister for providing protection against a great variety of poisonous gases, smokes and vapors accompanied by much coarser particulate matter, such as dust or mist.

A common type of gas mask canister is one filled with activated carbon and having at the bottom a screen and filter for supporting the carbon and for filtering dust entering a one-way inlet valve at the bottom of the canister. An outstanding disadvantage of this type of canister is that when the filter pad becomes contaminated or saturated with dust, the breathing efficiency of the canister is greatly reduced and the life of the canister considerably shortened. Usually the canister is thrown away after a substantial amount of dust has accumulated on the filter since the filter is not readily removable or replaceable. A still further disadvantage of this construction of canister is that when it is used in a gas mask employed in an atmosphere containing a substantial amount of poisonous finely divided mist, for example in greenhouse spraying wherein hexa ethyl tetra phosphate is used as an insecticide, or perhaps where Parathion (diethyl nitrophenyl thiophosphate) is used slightly volatile material is entrapped in droplet form in the cloth filter and is gradually liberated over a long period of time thereafter even when the gas mask is not in use, thereby contaminating the activated carbon with such released and migrating vapors and thereby reducing the efficiency as well as the life of the activated carbon filter. A still further disadvantage of common types of canisters is that insufficient dust filtering area is provided, thereby limiting the life of the canister, making it dependent entirely upon the amount of dust the filter can effectively collect and retain, whereas, in fact, were it not for the dust laden condition of the cloth filter, the activated carbon filter would be useful for a considerably longer period and the canister need not be discarded after relatively short use.

An object of the present invention is to provide a gas mask canister which is devoid of the above-mentioned disadvantages and which will have relatively high efficiency and long life despite its use in vaporous, misty or dusty atmospheres.

A more specific object of the present invention is to provide a canister filtering cup of such construction as to enable quick removal and simple replacement of the enclosed cloth or pulp filter when laden with dust, also to enable removal of the filter from the cup during periods of non-use of the canister so as to prevent solids or liquids entrapped in the filter from giving off trace vapors, which migrate through the activated carbon bed and thereby lessen its efficiency.

Other objects and advantages of the present invention will be apparent from a study of the following description, taken with the accompanying drawings wherein:

Fig. 2 is an enlarged longitudinal cross-sectional view of the gas mask canister shown in Fig. 1;

Fig. 3 is a bottom view of the perforated screw cap shown at the bottom of Fig. 2;

Fig. 4 is an enlarged fragmentary view of a modified type of connection between the filter cup and bottom of the canister;

Fig. 5 is a plan view showing the outer casing of the canister illustrated in Fig. 2;

Fig. 6 is a side view of the canister shown in Fig. 5;

Fig. 7 is a cross-sectional view of the one-way acting air inlet valve taken along line 7—7 of Fig. 5;

Fig. 8 is a bottom view of the perforated valve plate shown in Fig. 7;

Fig. 9 is a top plan view of the flexible valve diaphragm shown in Fig. 7;

Fig. 10 is a side view of the somewhat accordion-shaped hollow filter pad shown in Fig. 2;

Fig. 11 is a side view of the threaded and perforated filter cap shown at the bottom of the canister, and Fig. 12 is a fragmentary bottom view of the perforated filter cap illustrated in Fig. 11.

Figure 1:
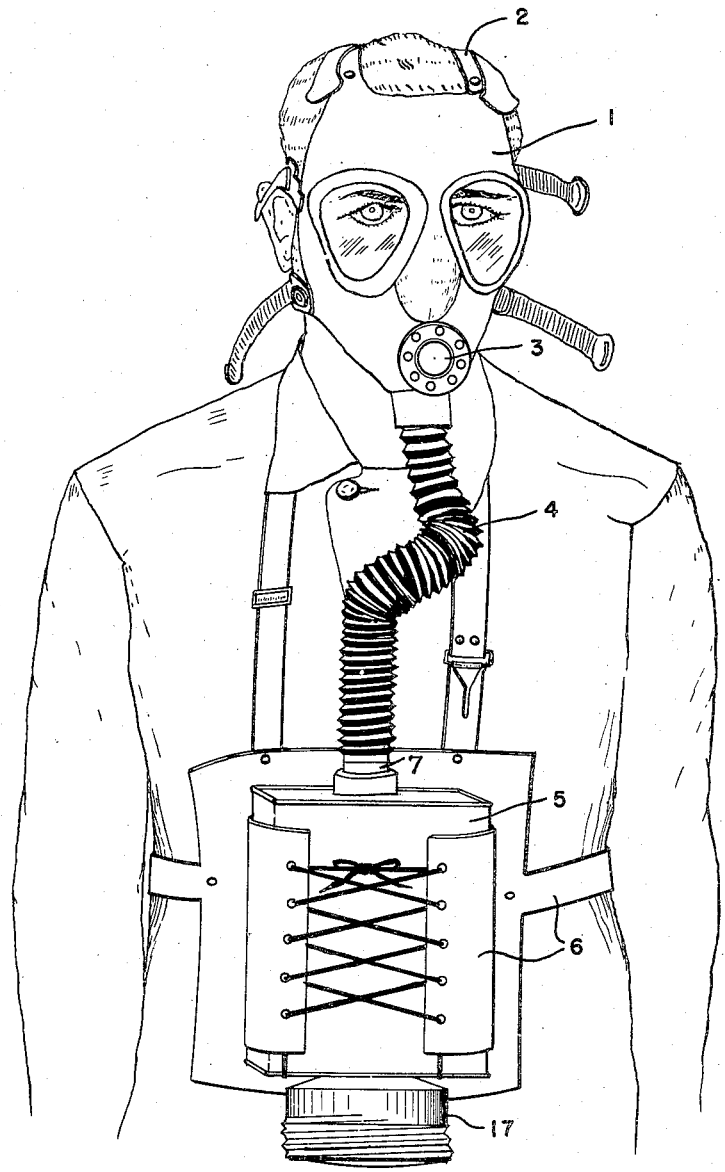
Fig. 1 is a fragmentary view of a man equipped with a gas mask including a canister embodying the principles of the present invention.

Referring more particularly to Fig. 1 of the drawings, numeral 1 denotes a mask or face piece which may be of rubber or other similar flexible material and is held onto the head of the wearer by a head harness 2. Large eye pieces, preferably of laminated glass or plastic material, are provided for giving a wide angle of vision. An exhalation valve 3 is provided in front of the mouth to carry the voice of the wearer sufficiently well that emergency instructions can be given and clearly understood without extra effort or discomfort to the wearer. A flexible breathing tube 4 is secured to the bottom of face piece 1 and is preferably of corrugated rubber to prevent kinking. It carries filtered air into the face piece to be inhaled. The lower end of the breathing tube 4 is connected to the neck portion or nozzle 7 of a canister 5, which canister is securely held in position and carried by the wearer by means of a carrying harness 6.

Referring more particularly to Fig. 2 which shows in detail the interior construction of my novel canister, it will be seen that adjacent the bottom wall of the canister there is provided a somewhat dome-shaped or concave-shaped metallic screen 8 which carries thereon a filter 9 of cheese cloth or similar material, often referred to as "milk filter" and helpful for the purpose of filtering out dust. Supported on the screen and filter is a layer of activated carbon 10 upon which is supported an intermediate layer of white soda lime 11 which, in turn, is covered by an uppermost layer of activated carbon 12. Of course, the canister may be filled instead entirely with activated carbon or with any other suitable gas and vapor filtering medium. Upon layer 12 is supported a cotton wadding 13 on which is superposed a screen 14 yieldingly pressed downwardly by canister springs 15, thereby exerting a small compressive force on the filtering layers to retain the desired degree of compactness thereof.

An important feature of the present invention is the addition of a filter cup 17 having an inwardly tapered upper portion or neck which is welded or soldered at 18 along the periphery of a hole formed centrally in the bottom 16 of the canister. As will appear more clearly in Figs. 2, 7, 8, and 9, a one-way acting air inlet valve is provided which includes a perforated valve plate 19 having supported thereon a valve diaphragm 20 of rubber or other suitable flexible material rigidly secured to the valve plate as by means of a central stud or screw 21.

Within the filter cup 17 there is supported a hollow filter pad 22 of cloth or pulp or similar material shaped somewhat like an accordion and including at its lowermost portion a filter disk 22a whose periphery is sealingly engaged with respect to the lower edge portion of the screw threaded part of filter cup 17. By screwing the perforated cap 23 tightly, a dust-tight joint is provided between the periphery of the filter disk 22a and the filter cup 17. Therefore, impure air will enter through holes 24 of screw cap 23 and will flow through the lower central opening of the hollow filter pad 22 to the interior of the filter pad, or through the filtering disk 22a. In either event, the air as it flows outwardly through the hollow filter pad walls will become filtered of dust particles and will flow into the space defined by the outer wall surface of the filter pad 22 and the filter cup 17.

Fig. 4 shows a modification of the filter cup and air inlet valve assembly wherein the valve plate 19 and valve diaphragm 20 are supported directly on and form an integral part of the bottom 16 of the canister and wherein the neck portion of filter cup 17 is welded or soldered or fixedly attached to the bottom 16. Therefore, it will be readily seen that the air inlet valve may be either a component part of the bottom wall of the canister as shown in Fig. 4 or a component part of the filter cup 17 as shown in Fig. 2, as desired.

In operation, it will be seen that impure air laden with dust, vapors or smoke will enter through the perforations 24 of the screw cap 23. And as the air enters the interior or hollow of the filter pad 22 either through the lower central opening thereof or through filter disk 22a it will flow through the walls of the filter pad and become purified of dust and thence will flow through the one-way acting valve diaphragm 20 since air as it is breathed inwardly, causes suction and uplifting of the peripheral edge portion of valve diaphragm 20. The air will be deflected substantially radially outwardly by diaphragm 20 and thus flow through a plurality of parallel paths along the outer peripheral portion of the various layers 10, 11 and 12. Thus the diaphragm 20 acts also as a shield to prevent channelling of the incoming air through the axial portion of the filter layers which would otherwise reduce the efficiency or filtering capacity of the layers of filtering material.

As dust-free air passes through the openings of the valve plate 19 and upwardly through the metal screen 8 and filter 9, it will become further filtered as it passes through layers 10, 11 and 12, which will absorb vapor or gases, such as carbon tetrachloride which are able to pass through the filter pad 22. Purified air as it emerges upwardly and flows through the nozzle 7 as a consequence of inhaling will be conducted by the tube 4 to the interior of the gas mask and will be breathed in by the wearer.

After filter pad 22 has become saturated or laden with dust, it may be easily and quickly replaced merely by unscrewing the perforated cap 23 and by substituting a new filter therefor.

If the gas mask is used while spraying vaporous or finely divided insecticide mists for example, such as in greenhouses, causing entrapped slightly volatile material to collect in the filter pad 22, it is preferable to remove the filter pad 22 during periods when the canister is not in use so as to prevent the possibility of contamination of the layers of filtering material by entrapped vapors which are gradually liberated from the filter pad and which would otherwise reduce the efficiency and life of the canister.

In view of the large area provided by the accordion-shaped filter walls, a considerable amount of dust can be collected before the filter is no longer useful, therefore a greater life is provided for the assembly. Since the filter may be replaced a number of times after becoming saturated with dust, it will be readily apparent that the life of the canister is extended many fold as compared to its life with the conventional built-in and non-replaceable dust filter which is sealed inside the bottom wall of the canister.

It will be noted that the face piece 1 may be of white instead of black rubber to possibly give added visibility of the wearer through dense fogs and smokes or for identification of officers of fire departments or men with special assignments. An added advantage of a white rubber face piece is that in many chemical operations, it will detect acid stains since acid splashes on white rubber are instantly noticeable. Gas masks with white rubber face pieces may be used advantageously where ethyl components are manufactured and processed.

Thus it will be seen that I have provided a very efficient gas mask canister which is designed to meet the extreme hazards and emergencies that arise in present day industrial manufacturing or agricultural operations where exist a great variety of poisonous gases, dusts and mists, including carbon tetrachloride, and wherein a filter cup is attached to the bottom thereof with a replaceable filter pad so as to make it possible to provide as many replacements of the pad as desired and thereby considerably prolong the life of the gas mask canister, also, whereby during periods of non-use of the canister, the pad may be removed and separated from the filter material in the canister and thus prevent contamination thereof with slowly liberated entrapped gaseous particles collected on the filter pad.

While I have illustrated and described certain specific embodiments of my invention, it will be apparent that these are by way of illustration only, and that various changes and modifications may be made within the contemplation of my invention and within the scope of the following claims.

I claim:

1. In a gas mask canister including a body of gas-filtering material and a substantially dome-shaped screen extended inwardly from the bottom of said canister for supporting said material, the bottom of said canister having a hole, a filtering cup having an inwardly tapered neck portion supported on the peripheral portion of said bottom which defines said hole, a one-way acting air inlet valve mounted on said neck portion and underneath said screen, a dust-filtering, hollow filter pad contained within said filter cup including an integral lowermost filter disk having a hole coincident with the opening of said pad, and a perforated screw cap providing screw threaded engagement with the mouth portion of said filter cup and for providing an air-tight seal between said mouth portion and the peripheral portion of said disk, whereby said hollow filter pad may be readily removed and replaced by the mere unscrewing of said perforated screw cap.

2. A combination canister and filtering cup unit for gas masks and similar apparatus, comprising a canister substantially filled with chemical filtering particles, a screen for supporting said particles, said screen being substantially dish shaped and disposed at the bottom of said canister so as to provide a hollow space, said canister having a bottom wall underneath said screen, forming the lowermost defining wall of said space and including a central hole, a filter cup having a mouth portion integrally secured to the peripheral portion of said bottom wall which defines said hole, a perforated disc supported on said mouth portion within said hollow space, a one-way acting air inlet valve in the form of a flexible diaphragm of disc shape supported centrally on said perforated disc for deflecting incoming air substantially radially outwardly to the peripheral portions of said chemical filtering particles so as to prevent channelling through the axial portions thereof, a removable filter pad contained within said filter cup, and a readily detachable foraminous cover in screw threaded engagement with the bottom of said filter cup and adapted for holding said filter pad in sealing engagement with the outermost mouth of said cup.

ERIC A. BETHIG.

REFERENCES CITED

The following references are of record in the file of this patent:

UNITED STATES PATENTS

| Number | Name | Date |
|---|---|---|
| 1,596,060 | Mase | Aug. 17, 1926 |
| 1,789,194 | Rockwell | Jan. 13, 1931 |
| 2,395,298 | Shock | Feb. 19, 1946 |

FOREIGN PATENTS

| Number | Country | Date |
|---|---|---|
| 640,810 | France | July 23, 1928 |
| 765,982 | France | June 19, 1934 |